Aug. 19, 1924.
L. H. TIMMONS
SPRING
Filed Aug. 3, 1922
1,505,445
2 Sheets-Sheet 1
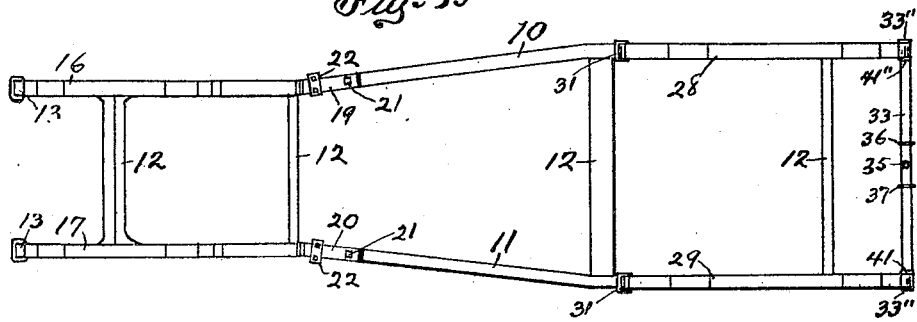
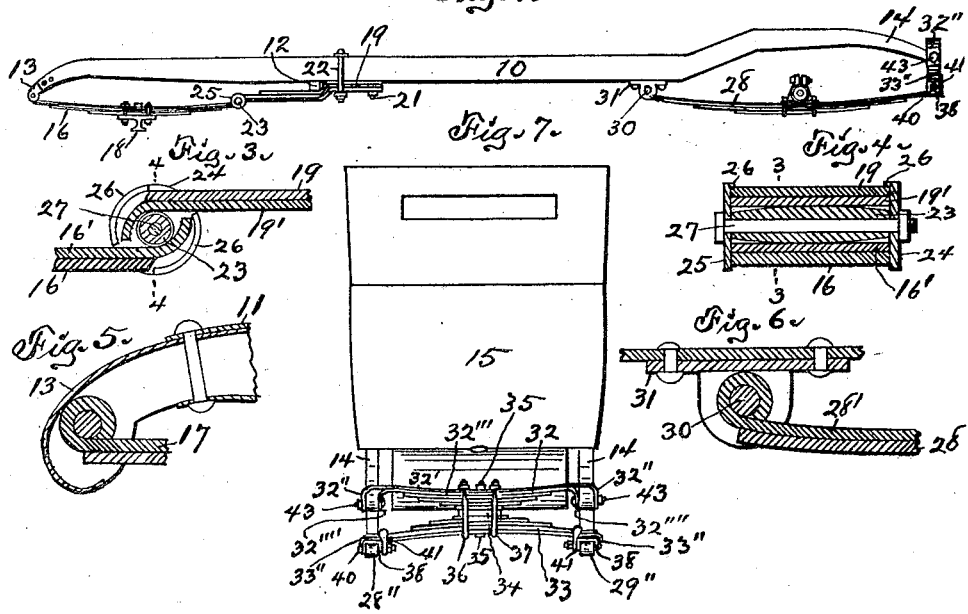
INVENTOR
L. H. Timmons
BY Silas L. Sweet
ATTORNEY Aug. 19, 1924.
L. H. TIMMONS
SPRING
Filed Aug. 3, 1922   2 Sheets-Sheet 2
1,505,445
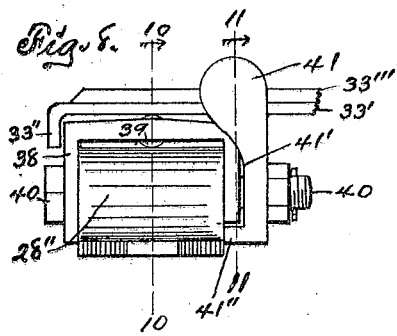
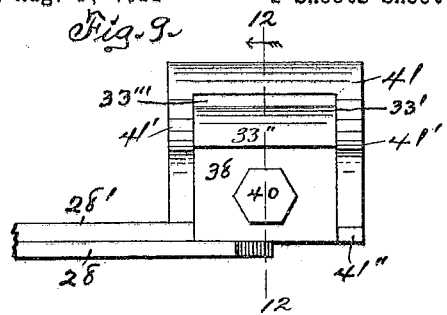
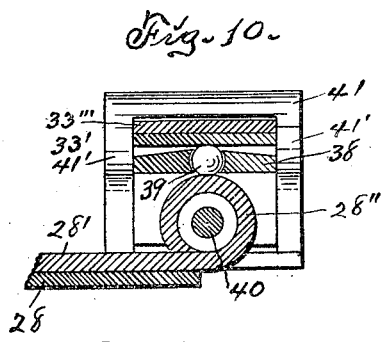
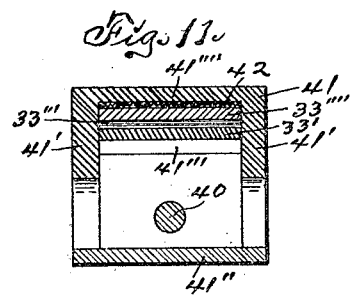
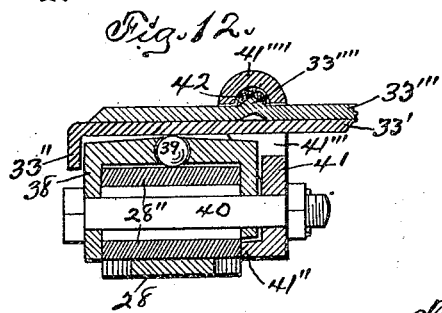
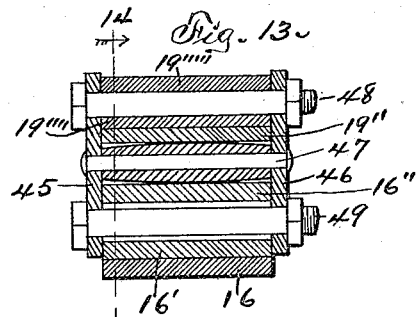
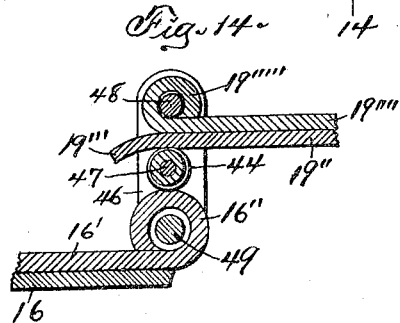
INVENTOR
L. H. Timmons
BY Silas L. Sweet
ATTORNEY Patented Aug. 19, 1924.

1,505,445

UNITED STATES PATENT OFFICE.

LINDSAY H. TIMMONS, OF DES MOINES, IOWA, ASSIGNOR OF ONE-HALF TO GEORGE B. FROST, OF DES MOINES, IOWA.

SPRING.

Application filed August 3, 1922. Serial No. 579,490.

*To all whom it may concern:*

Be it known that I, LINDSAY H. TIMMONS, a citizen of the United States of America, and resident of Des Moines, Polk County, Iowa, have invented new and useful Springs, of which the following is a specification.

An object of this invention is to provide improved means for limiting and minimizing lateral vibration of the frame and body carried thereon relative to the axles of an automobile.

A further object of this invention is to provide improved means for limiting and minimizing friction and wear of parts in vertical vibration of the frame and body relative to the axles of an automobile.

A further object of this invention is to provide improved means for limiting and minimizing vertical vibration of a body and frame, and either of them, relative to the axles and wheels of an automobile, whereby uneven surfaces, corrugations and "wrinkles" in a road surface may be traversed without noticeable vertical vibration, jarring or jolting of the body.

A further object of this invention is to provide improved means whereby the range of vertical vibration of an axle and wheels, or either of them, is materially enlarged or lengthened without noticeably reacting on the frame or body of an automobile, thus permitting the use of such automobile on very rough, choppy and transversely-rutted roadways without noticeable vertical vibration, jarring or jolting of the frame or body.

A further object of this invention is to provide improved means for increasing the range of vertical movement of wheels and axles of an automobile prior to any reaction of a sudden, jarring or jolting character thereon by the load carried thereby, represented by the frame, body and contents of the body, thus avoiding a large amount of blows of the load on the tires of the wheels and materially increasing the life and usefulness of said tires.

A further object of this invention is to provide a relief spring (in any desired number) auxiliary to the main spring or springs between the axles and load of an automobile, and connections including a rolling contact member between said relief and main springs whereby risk or danger of breakage of the main spring or springs under impact, reaction or torsion is minimized or eliminated.

A further object of this invention is to provide an improved construction in automobile springs whereby a shackle is omitted and a relief spring is substituted therefor and connections are provided between said relief spring and a main spring including a rolling member and confining elements.

A further object of this invention is to provide means for limiting the flexure or articulation between a main and relief spring.

A further object of this invention is to provide an improved construction for automobile platform springs whereby shackles are omitted and a cross-connection is substituted for each of them including a rolling contact member and confining or stirrup members.

A further object of this invention is to provide improved means for retaining and confining a rolling contact member between spring members.

A further object of this invention is to provide improved means for connecting a hammock or semi-elliptic spring to the rear horns of an automobile frame.

A further object of this invention is to provide improved means for connecting a semi-elliptic spring at its ends to the rear ends of side semi-elliptic springs of an automobile, whereby lateral vibration of the frame and body relative to the side springs is minimized or eliminated.

A further object of this invention is to provide improved means for connecting the rear ends of side springs to the rear horns of the frame of an automobile, by end semi-elliptic springs placed back to back, connected rigidly in their central portions and connected at their ends to the side springs and horns respectively, one set of the connections including a rolling contact member.

My invention consists in the construction, arrangement and combination of elements hereinafter set forth, pointed out in my claims and illustrated by the accompanying drawing, in which—

Figure 1 is a bottom plan of an automobile frame showing my improved spring assembly thereon. Figure 2 is a side elevation of the same. Figure 3 is a cross-section on the indicated line 3—3 of Figure 4.

Figure 4 is a cross-section on the indicated line 4—4 of Figure 3. Figure 5, is an elevation, partly in section, showing the connection between the front horn and the front end of a front side spring. Figure 6 is an elevation, partly in section, showing the connection between the front end of a rear side spring and a frame bar. Figure 7 is a rear elevation of the body, frame and platform spring, showing my improved connection between the rear horns and the rear side springs. Figure 8 is a fragmentary rear elevation showing the connection between one end of an end spring and the rear end of a rear side spring. Figure 9 is a fragmentary side elevation of the same elements as are shown in Figure 8. Figure 10 is an elevation, partly in section on the indicated line 10—10 of Figure 8. Figure 11 is a vertical section on the indicated line 11—11 of Figure 8. Figure 12 is a vertical section on the indicated line 12—12 of Figure 9. Figures 13 and 14 are vertical sections, at right angles to each other, illustrating a modified construction adapting my invention as a substitution of parts on an automobile after it has been otherwise constructed, such as a "used" car. Figures 3, 4, 5, 6, 8, 9, 10, 11, 12, 13 and 14 are on an enlarged scale.

In the construction of the machine as shown the numerals 10, 11 designate side bars of an automobile frame of common construction, which are suitably and rigidly connected by cross-bars 12 suitably spaced apart. Each side bar 10, 11 is formed with a down-turned horn 13 at its forward end and an upwardly-arched horn 14 at its rear end; the upward arching of the rear horns 14 providing space for an upward movement of a rear axle across the horizontal plane of the major portions of said bars. The side bars 10, 11 and cross-bars 12, including the horns 13, 14, are sometimes referred to herein as the frame, and said frame is adapted to support a body 15, motor, hood, step-boards, skirts, fenders and other parts and accessories desired to be used in and on an automobile; parts being omitted that do not relate intimately to my present invention. Front side-springs 16, 17 are arranged beneath and substantially parallel with the front end portions of the side-bars 10, 11 and are pivoted at their forward ends to the extremities of the horns 13 (Figure 5) in a common manner. The springs 16, 17 are of semi-elliptic form and are supported at their centers by a front axle 18 extending transversely thereof and clamped thereto in a common manner, said front axle being, in turn, supported by steering wheels not shown. Relief-springs 19, 20, of laminated leaf type, are arranged beneath and substantially parallel with the side bars 10, 11 somewhat forward of the centers thereof, and the rear end portions of said relief-springs are bolted and clamped to said bars, the bolts being designated by the numerals 21 and the clamps by the numerals 22. The lowermost leaf 19', of each relief-spring 19, 20, is curved downwardly in opposition to and overlapping relation with an upturned rear end portion of the uppermost leaf 16' of each side-spring 16, 17, and the arcs of curvature of said leaves 19' and 16' preferably relate to the same circle. A barrel-shaped roller 23 is interposed between and separates the curved extremities of the leaves 19' and 16' and the radius of said roller preferably is less than that of the curves of the leaves contacting therewith. Washers 24, 25, having mutilated flanges 26 extending inwardly from their rims, are mounted parallel with each other on opposite sides of the curved extremities of the leaves 19', 16' and overlay the ends of the rollers 23, and a bolt 27 is mounted loosely through said washers and roller and connects each set thereof separately. It will be noted that the front ends of the side springs 16, 17 are rigidly spaced apart by the horns 13; that the central portions of said springs are rigidly spaced apart by the frame; that the rear portions of the relief-springs are rigidly spaced apart by the frame and that the forward portions of the relief-springs are supported by the rear portions of the side-springs and the connection between them is by rolling contact through the medium of the barrel-shaped rollers 23. Thus provision is made for the vertical vibration of materially greater range than is now common in the attachment of the rear ends of the side-springs to shackles depending from the frame-bars. Also the barrel-shape of the rollers 23 maintains the rolling contact between the curved ends of the leaves even when the side-springs are canted relative to the relief-springs, such as by swaying of the body 15 laterally or by inclination of the axle 18 through rise or fall of one wheel relative to another, without risk or danger of breaking either spring. This is contra-distinguished to the common construction wherein the shackles are employed and the side springs are connected to the shackles by straight bolts providing no freedom of torsional or canting movement and hence put an undue strain on the springs when they are vertically vibrated in twisted or canted positions, resulting in breakage. Rear side-springs 28, 29 are arranged beneath and substantially parallel with the arched portions 14 of the side bars 10, 11. The side-springs 28, 29 are semi-elliptic in form and of laminated type and are arched downwardly in opposition to the upward arching of the portions 14. The uppermost leaf 28' of each side-spring 28, 29, is pivoted on a transverse bolt 30 (Fig. 6) carried in a horizontal position by brackets 31 secured to and depending from the side-bars 10, 11 somewhat rearward of the centers of said bars; such connection being at the forward ends of the rear side-springs. End-springs 32, 33, of semi-elliptic form and laminated type (Figure 7), are placed back to back, spaced apart at their centers by a block 34, assembled individually on opposite sides of the block by vertically alining bolts 35 and connected together on opposite sides of said bolts by clips 36, 37. The springs 32, 33, connected substantially as shown, constitute a relief-spring assembly for the rear end of the frame and car-body. The spring 33 is connected at its ends to and is carried by the rear ends of the rear side-springs 28, 29 and the spring 32 is connected at its ends to and, in turn, carries the rear horns of the frame bars. The uppermost leaf 28' of each side-spring 28, 29 is formed with an eye 28'' and a retainer 38, of yoke form is mounted in straddling relation on and extends across the top of each eye. A rolling contact member, in this instance a ball 39 is carried loosely in the central portion of the bar or body of the retainer 38 and rests on the eye 28''. A bolt 40 extends loosely through eye 28'' and through the arms of the retainer 38 and a stirrup 41 is mounted on the inner end of each bolt. The stirrup 41 is somewhat wider than the adjacent arm of the retainer 38 and is formed with side flanges 41' between which said arm is received; and said arm is shorter than the opposite arm and the stirrup is formed with a bottom flange 41'' extending beneath the shorter arm and engaging the adjacent end of the eye 28''. The stirrup 41 is formed with a transverse slot 41''' overlapping and extending above the top of the retainer 38 and the lowermost two leaves of the spring 33 extend at their ends through said slots in two spaced stirrups (Figure 7). The lowermost leaf 33' of the spring 33 extends at each end across a retainer 38 and rests on the ball 39 and is formed with an end flange 33'' overlapping the outer end and arm of the retainer. The leaf 33' having flanges 33'' on its opposite ends embracing the spaced retainers on opposite side-springs 28, 29 the spring 33 tends to prevent undue separation or spreading of the rear ends of said side-springs; yet there is a space between each of the end flanges 33'' and the adjacent wall of the retainers which permits some freedom of movement by canting, twisting or torsion of the side-springs without binding or cramping the same; and the end portions of said leaf ride on the balls 39 whereby endwise movement of said end portions relative to the spaced retainers, under rise and fall of the center of the end spring is permitted. Similarly, the balls, or either of them, will roll on and transversely of the lower face of the end portions of the leaf 33' under endwise movement of the rear ends of the side-springs 28, 29 due to vertical vibration of the eyes 28''. It is not likely that, at any time, the inner wall of either eye 28'' will contact with the bolt, or that there will be any noticeable wear of the bolt or eye or leaf end in use, owing to the elimination of the ordinary shackle arrangement and the substitution therefor of the rolling-contact devices. The second leaf 33'''' of the spring 33 extends at its ends nearly to the ends of the leaf 33' and through the slots 41''' in the stirrups 41 and is formed at each end with a transverse struck-up rib 33''''' extending within and spaced from the concaved crown 41''''' of a stirrup. Suitable packing strips 42, such as of felt, may be interposed between the rib 33''''' and crown 41''''' and be supplied with oil to lubricate the bearing at that point and prevent rusting and corrosion thereof. The inter-relation of the ribs 33''''' and crowns 41''''' permit endwise movement of the end portions of the leaf 33'''' through the stirrups 41 coincident with similar endwise movement of the ends of the leaf 33' in rolling contact with the balls 39. The uppermost leaf 32' of the end spring 32 is formed with downturned end flanges 32'' overlapping and extending across the outer ends of apertures in the rear horns of the side-bars 10, 11 and the second leaf 32''' of said spring is formed with down-turned end flanges 32'''' parallel with and spaced from the flanges 32'' and extending across the inner ends of said apertures; the end portions the leaf 32', adjacent its flanges, being spaced from the horns. Bolts 43 are mounted in registering holes in the end flanges 32'' and 32'''' and the apertures in the rear horns and pivotally support the horns on the ends of the end spring 32.

In Figures 13 and 14 a modified construction is illustrated whereby my relief springs 19, 20, in substance, may be substituted for a shackle and applied on an automobile which may have been sold and used with common construction. In such common construction, the front side springs are made with an eye 16'' on the rear end of each uppermost leaf 16' adapted to support a shackle. Under this improved construction, the shackle would be removed and dispensed with. Relief-springs, one of which 19'' is shown, are mounted as are the similar springs in Figures 1 and 2, and the lowermost leaf thereof is formed with a down-turned forward end portion 19''' while the second leaf 19'''' is formed with an eye 19''''' overlaying and spaced from the eye 16''. A barrel-shaped roller 44 is mounted on the eye 16'' and the down-turned arcuate end portion 19''' rests on said roller. Straps 45, 46 are mounted across the ends of the eye 16'', roller 44 and eye 19''''' and a rivet 47 is passed through and connects the central portions of said straps and forms a journal for the roller. Bolts 48, 49 are mounted through the upper and lower ends of the straps and through the eyes 19''''' and 16'' respectively and connect said straps. The bolts 48, 49 are loose-fitting in the eyes and have no material wear or friction on the inner walls thereof; the straps and bolts serving as retainer for the barrel-shaped roller 44, which takes the load by rolling contact between the lower eye and the leaf end 19'''. My preferred construction is best adapted for standard equipment, while the other is a substitution.

I claim as my invention—

1. In a spring construction, the combination with a frame having front and rear horns and parallel axles carrying some of the springs, of front side springs carried by one axle and pivoted at their forward ends to the front horns, relief springs fixed to the frame at the rear of and overlapping said side springs, a rolling-contact member between the overlapping portions of the side and relief springs and a rear-spring assembly carried by the other axle and carrying the rear portion of the frame.

2. In a spring assembly the combination of a side spring adapted to be carried by an axle and adapted to be pivoted at its front end to a frame carried in part thereby, a relief spring adapted to be fixed to said frame and overlapping at its front end above the rear end of the side spring, a rolling-contact member interposed between the overlapping portions of said springs, and means for confining said member relative to said springs.

3. In a spring assembly the combination of a side spring, formed with an upturned rear end portion, a relief spring formed with a down-turned forward end portion overlapping said upturned portion, a barrel-shaped roller interposed between said overlapping portions and means for confining said roller.

4. In a spring assembly the combination of a side spring formed with an upturned rear end portion, a relief spring formed with a down-turned forward end portion overlapping said upturned portion, a barrel-shaped roller interposed between and contacting with said overlapping portions, a bolt journaled in said roller, and washers on the ends of said bolt spanning the ends of the roller and the adjacent sides of the overlapping portions of the springs.

5. In a spring assembly the combination of a side spring formed with an upturned arcuate end portion, a relief spring formed with an arcuate down-turned end portion overlapping the upturned portion, a barrel-shaped roller interposed between and contacting with said arcuate portions, the radius of the arcuate portions being greater than that of the roller, and means for confining said roller.

6. In a spring assembly the combination of a side spring formed with an upturned arcuate end portion, a relief spring formed with a down-turned arcuate end portion overlapping said upturned portion, a barrel-shaped roller interposed between and contacting with said arcuate overlapping portions, the radius of the arcuate portions being greater than that of the roller, a bolt journaled in said roller and extending across said arcuate portions, and washers on the ends of said bolt and spanning the adjacent sides of the overlapping arcuate portions, said washers being formed with in-turned mutilated flanges.

Signed at Des Moines, in the county of Polk and State of Iowa, this 31st day of July, 1922.

LINDSAY H. TIMMONS.